United States Patent
Tene et al.

(10) Patent No.: US 8,452,938 B1
(45) Date of Patent: May 28, 2013

(54) GARBAGE COLLECTION WITH MEMORY QUICK RELEASE

(75) Inventors: Gil Tene, Los Altos Hills, CA (US); Michael A. Wolf, San Francisco, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 728 days.

(21) Appl. No.: 12/082,238

(22) Filed: Apr. 8, 2008

Related U.S. Application Data (63) Continuation-in-part of application No. 11/321,694, filed on Dec. 28, 2005, now abandoned.

(60) Provisional application No. 60/640,383, filed on Dec. 30, 2004.

(51) Int. Cl.
*G06F 12/00* (2006.01)

(52) U.S. Cl.
USPC ............................ 711/170; 707/813; 707/817

(58) Field of Classification Search
USPC .................................................. 711/203, 205
See application file for complete search history.

(56) References Cited

U.S. PATENT DOCUMENTS

| | | | | |
|---|---|---|---|---|
| 4,989,134 A * | 1/1991 | Shaw | | 1/1 |
| 5,088,036 A * | 2/1992 | Ellis et al. | | 1/1 |
| 5,581,722 A * | 12/1996 | Welland | | 711/207 |
| 5,737,742 A * | 4/1998 | Achiwa et al. | | 711/103 |
| 5,845,298 A | 12/1998 | O'Connor et al. | | |
| 5,848,423 A | 12/1998 | Ebrahim et al. | | |
| 6,000,006 A * | 12/1999 | Bruce et al. | | 711/103 |
| 6,052,699 A | 4/2000 | Huelsbergen et al. | | |
| 6,226,653 B1 | 5/2001 | Alpern et al. | | |
| 6,249,793 B1 * | 6/2001 | Printezis et al. | | 1/1 |
| 6,470,361 B1 | 10/2002 | Alpern et al. | | |
| 6,480,862 B1 * | 11/2002 | Gall | | 1/1 |
| 6,510,440 B1 | 1/2003 | Alpern et al. | | |
| 6,546,546 B1 | 4/2003 | Van Doorn | | |
| 6,931,504 B2 * | 8/2005 | Wolczko et al. | | 711/165 |
| 7,310,655 B2 * | 12/2007 | Dussud | | 707/700 |
| 7,321,909 B1 * | 1/2008 | Garthwaite | | 1/1 |
| 7,523,290 B2 * | 4/2009 | Franaszek et al. | | 711/206 |
| 7,702,844 B2 * | 4/2010 | Chung et al. | | 711/103 |
| 2002/0108025 A1 * | 8/2002 | Shaylor | | 711/203 |
| 2003/0069905 A1 * | 4/2003 | Dussud | | 707/206 |
| 2004/0078381 A1 * | 4/2004 | Blandy et al. | | 707/101 |
| 2006/0047920 A1 | 3/2006 | Moore et al. | | |
| 2006/0155791 A1 * | 7/2006 | Tene et al. | | 707/206 |
| 2006/0173939 A1 * | 8/2006 | Yin et al. | | 707/206 |
| 2006/0248130 A1 * | 11/2006 | Grarup et al. | | 707/206 |
| 2006/0271919 A1 * | 11/2006 | Moyer | | 717/136 |

OTHER PUBLICATIONS

Jonathan Bowen, "Z80 Instruction Set Summary", Oxford, England, updated Apr. 1985, Issue 1.3.

* cited by examiner

*Primary Examiner* — Kaushikkumar Patel
(74) *Attorney, Agent, or Firm* — Van Pelt, Yi & James LLP (57) ABSTRACT

Memory management includes identifying a region of virtual memory to be reclaimed, the region including at an object that is currently located at an original virtual memory location, and the region being supported by at least a portion of a memory resource; relocating the object from the original virtual memory location to a target virtual memory location; remapping one or more references to the object to the target virtual memory location; and releasing the portion of the memory resource prior to or contemporaneously with remapping the one or more references to the target location.

20 Claims, 11 Drawing Sheets

GARBAGE COLLECTION WITH MEMORY QUICK RELEASE

CROSS REFERENCE TO OTHER APPLICATIONS

This application is a continuation in part of U.S. patent application Ser. No. 11/321,694, entitled GARBAGE COLLECTION filed Dec. 28, 2005 now abandoned, which claims priority to U.S. Provisional Application No. 60/640,383, entitled PAUSELESS GC IN THE AZUL JVM filed Dec. 30, 2004, which are incorporated herein by reference for all purposes.

BACKGROUND OF THE INVENTION

Garbage collection is implemented by many modern computer systems to manage computer memory. The garbage collector identifies memory areas that can be reclaimed and recycles the memory. Usually, to reclaim an area of memory, the garbage collector examines each object in the area, determines whether the object is alive (still in use) or dead (no longer in use), relocates the live objects to a new area, remaps any references to such live objects, and releases the old memory area. The old memory area is typically unusable during the time the live objects are relocated and remapped. Thus, the system may be required to supply a greater amount of memory than what is in actual use to ensure proper operations. The cost of such systems tends to be higher than non-garbage collected systems due to the increased memory demand. It would be useful to have a more efficient technique of managing memory and performing garbage collection. It would also be desirable if the technique could be implemented effectively without significantly raising system cost.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Memory management in an environment that supports garbage collection is disclosed. In some embodiments, the garbage collector or other appropriate memory management process identifies one or more regions of virtual memory to be reclaimed. The region includes one or more objects that are currently located at an original (or source) virtual memory location and that are supported by at least a portion of a memory resource. Each object is relocated from the source virtual memory location to a target virtual memory location, and references to the object are remapped to the target location. The portion of the memory resource is released prior to or contemporaneously with remapping the one or more references to the target location, thus achieving more efficient use of memory resources.

Figure 1A:
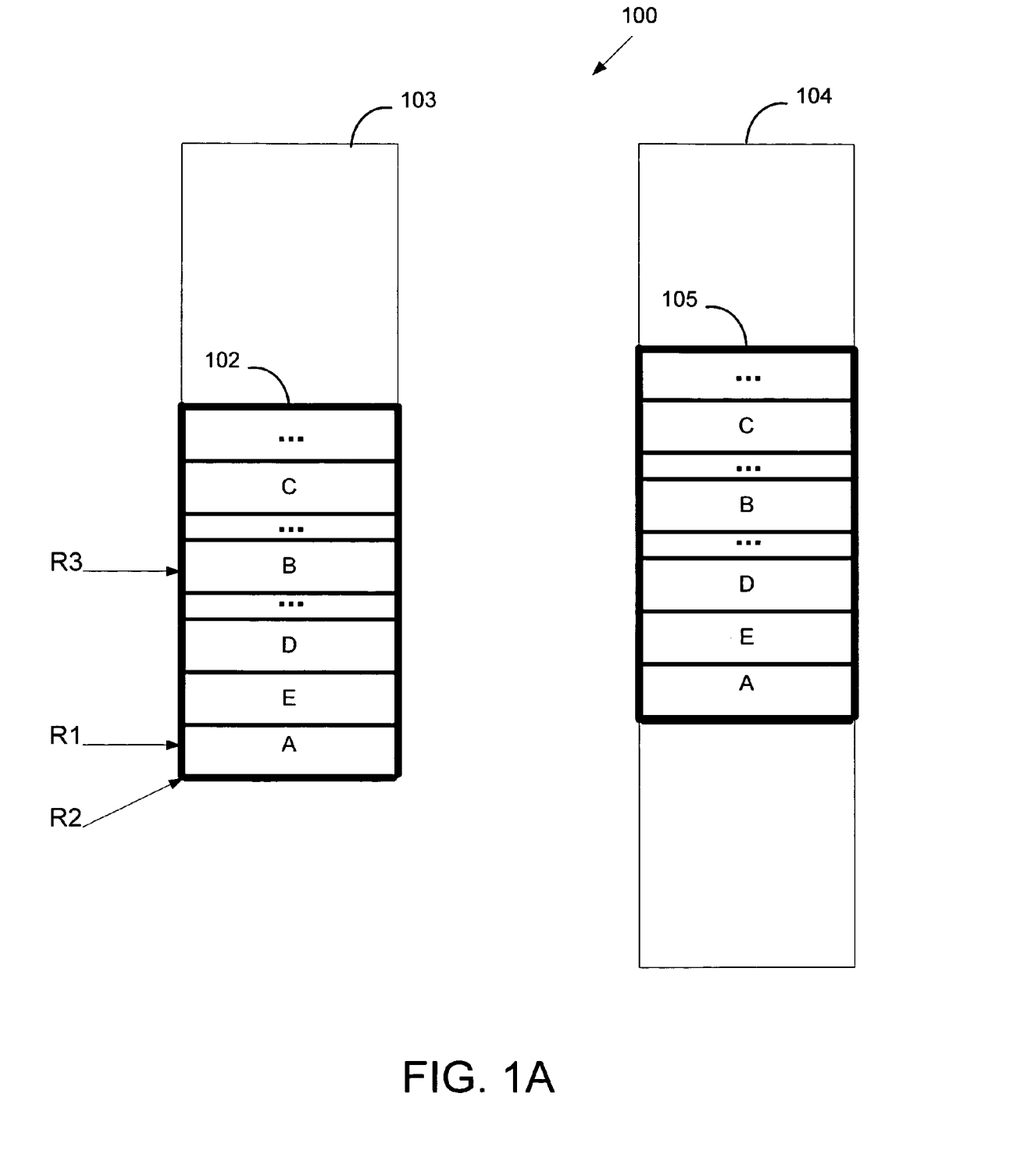
FIGS. 1A-1C are diagrams illustrating an example of an object relocation and remapping process.
Figure 1B:
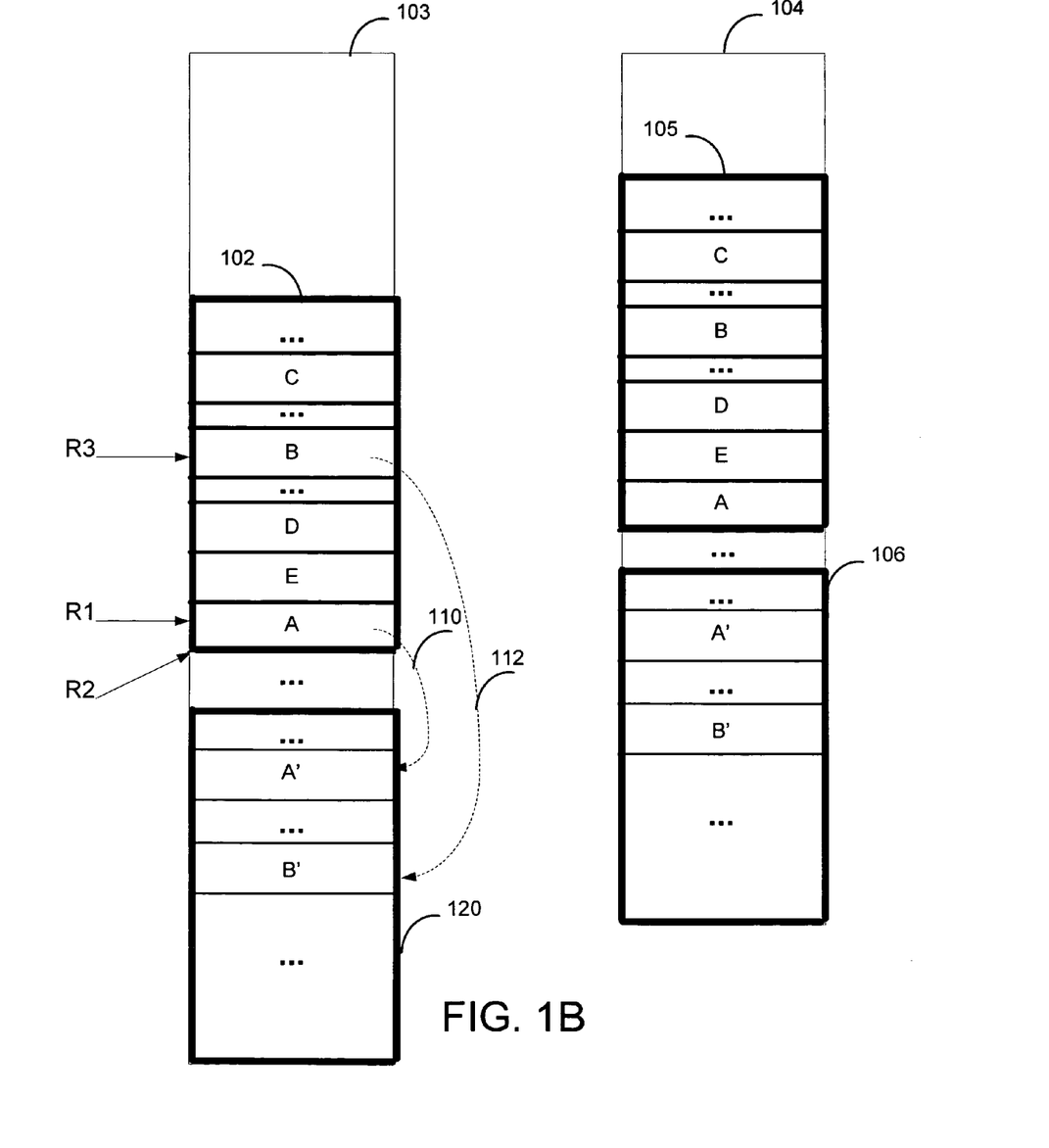
Figure 1C:
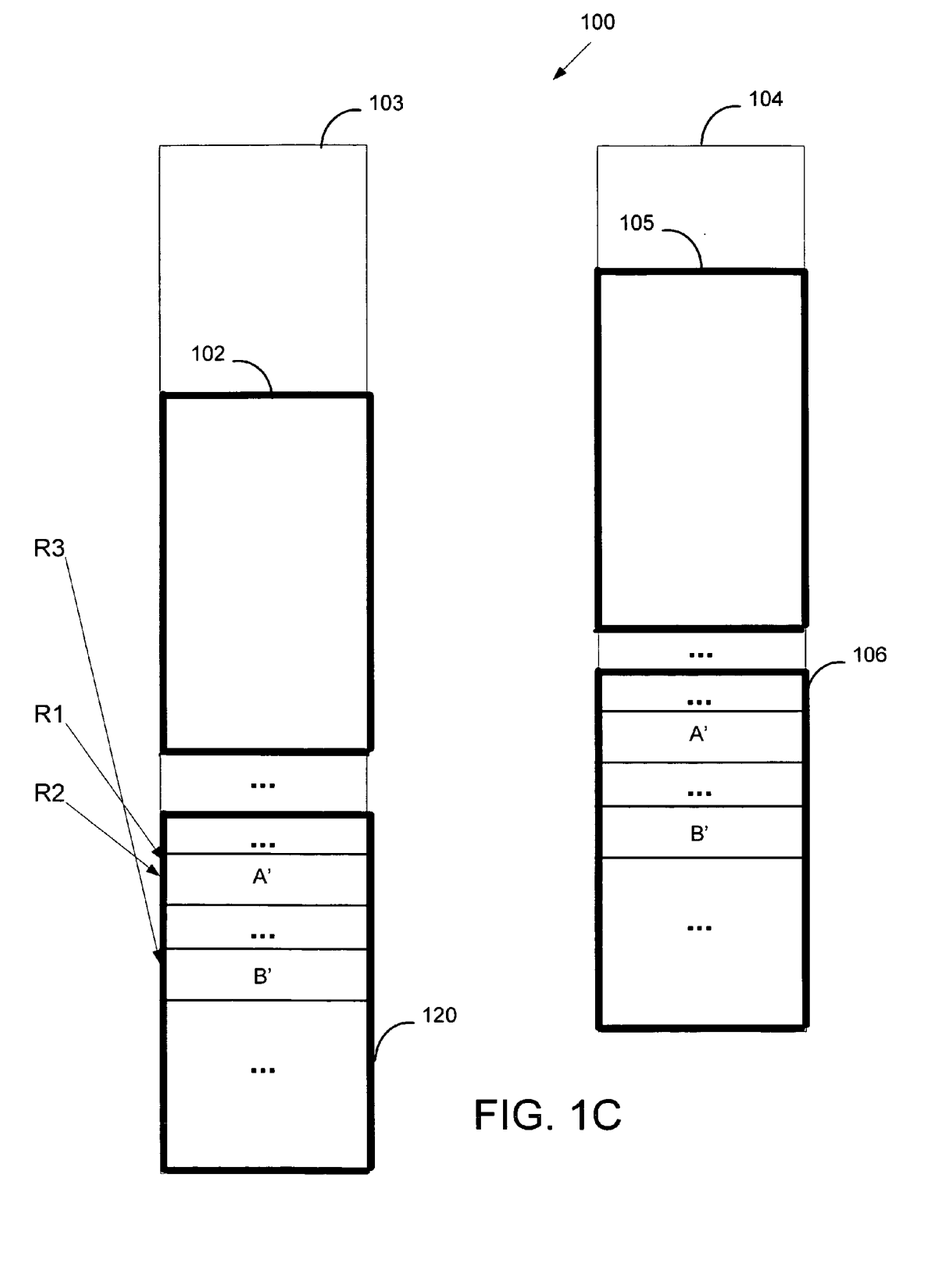

FIGS. 1A-1C are memory diagrams illustrating an example of an object relocation and remapping process. Memory system 100 shown in FIG. 1A includes memory resource 104, which is the physical storage component of the system. The memory resource may be random access memory (RAM), registers, caches, etc. implemented using one or more semiconductor chips, hard disks, flash devices, and/or any other appropriate form of volatile and/or non-volatile storage device(s). Virtual memory space 103 is divided into blocks. Block 102 is an area of virtual memory to be reclaimed. In some embodiments, virtual memory block 102 corresponds to a page in the virtual memory address space. The memory addresses in the virtual memory area are logical addresses, which are mapped to physical addresses in the physical memory using a mechanism such as a page table. In some embodiments, the page table is assisted by processor logic that includes a translation lookaside buffer (TLB). Multiple layers of mapping are possible and in some embodiments the physical memory includes secondary and/or tertiary data storage devices.

In the example shown, virtual memory block 102 is supported by a physical region 105 that lies within memory resource 104. Specifically, objects A, B, C, D, and E in virtual memory block 102 are supported by corresponding objects A, B, C, D, and E in physical memory regions 105. Each object occupies a range of virtual addresses in the virtual memory space. A corresponding set of physical memory addresses in the physical memory region map to the virtual addresses and support the virtual object by providing storage (e.g., memory cells) for the contents of the object in the physical memory region.

In the example shown, objects C, D and E are dead objects since there are no outside references to these objects. Live object A is referenced by references R1 and R2, and live object B is referenced by R3. One way to reclaim virtual memory area 102 and corresponding physical memory area 105 is to copy A and B to a new virtual memory area 120 as shown in FIG. 1B. Virtual memory area 120 is supported by physical region 106. Copies A' and B' are supported by corresponding objects A' and B' residing in physical memory region 106. Objects A and B maintain forwarding pointers to A' and B'. The forwarding pointers are stored within objects A and B, and are shown as arrows 110 and 112 pointing to A' and B' respectively. In FIG. 1C, references R1-R3 remap to A' and B' by following the forwarding pointers. Since these forwarding pointers are maintained within virtual memory area 102, memory can be recycled only after remapping is complete. In other words, only after the references are remapped, can area 102 be released and the memory resource supporting it (i.e. physical region 105) be reused.

Figure 2:
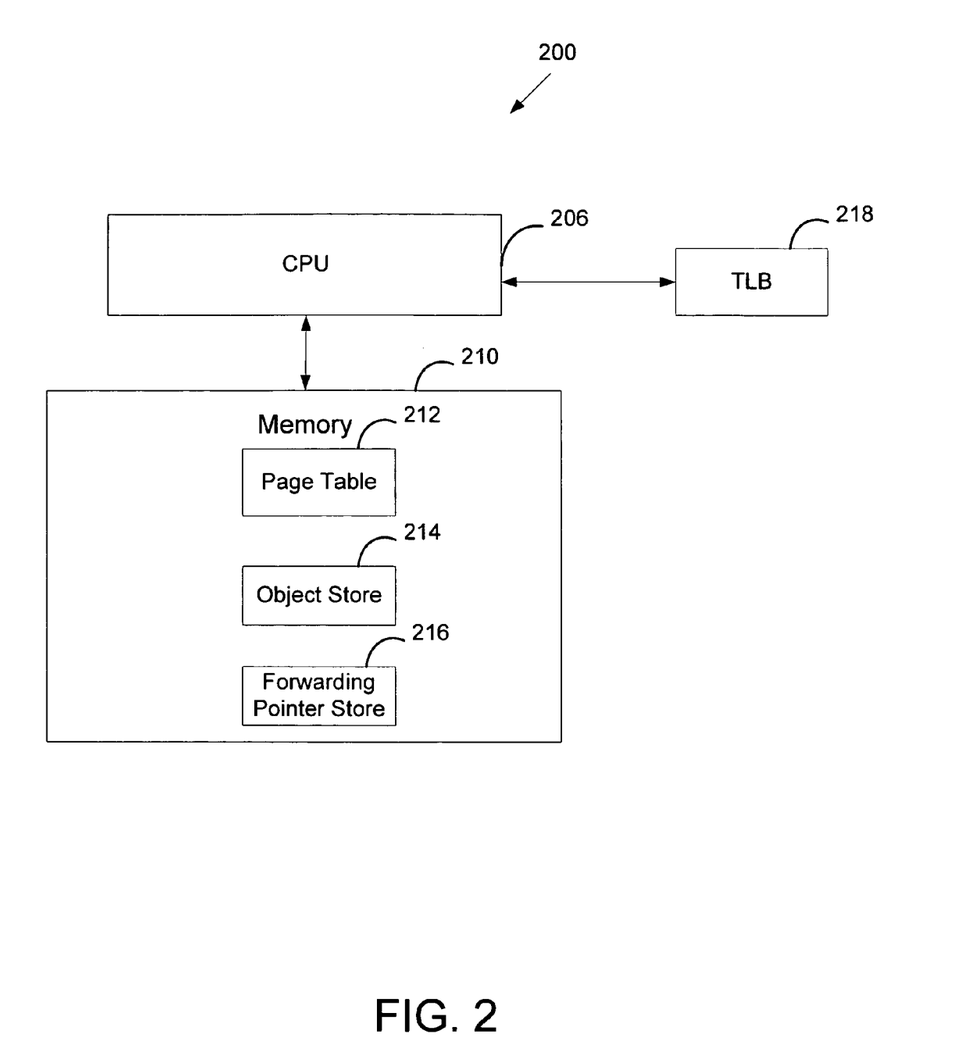
FIG. 2 is a block diagram illustrating an embodiment of a system with a quick releasing garbage collector.

The above process requires reference remapping prior to releasing the virtual and physical memory resource associated with the block containing the source location of the object. A quick release technique is used to recycle some memory resources, especially physical memory, more quickly, even before reference remapping completes. FIG. 2 is a block diagram illustrating an embodiment of a system that supports quick release garbage collection. System 200 includes a central processing unit (CPU) 206, a memory 210, and a TLB 218 used to translate virtual addresses into physical addresses. Additional processors and/or memory components are included in some embodiments. In this example, a page table 212 is stored in the memory and used to maintain a mapping of virtual addresses into physical addresses. A forwarding pointer store 216 is also included in the memory to facilitate object relocation and remapping. The forwarding pointer store may be a table, an array, or any other appropriate data structure. An object store 214 is also included in the memory for storing the contents of the objects.

Figure 3:
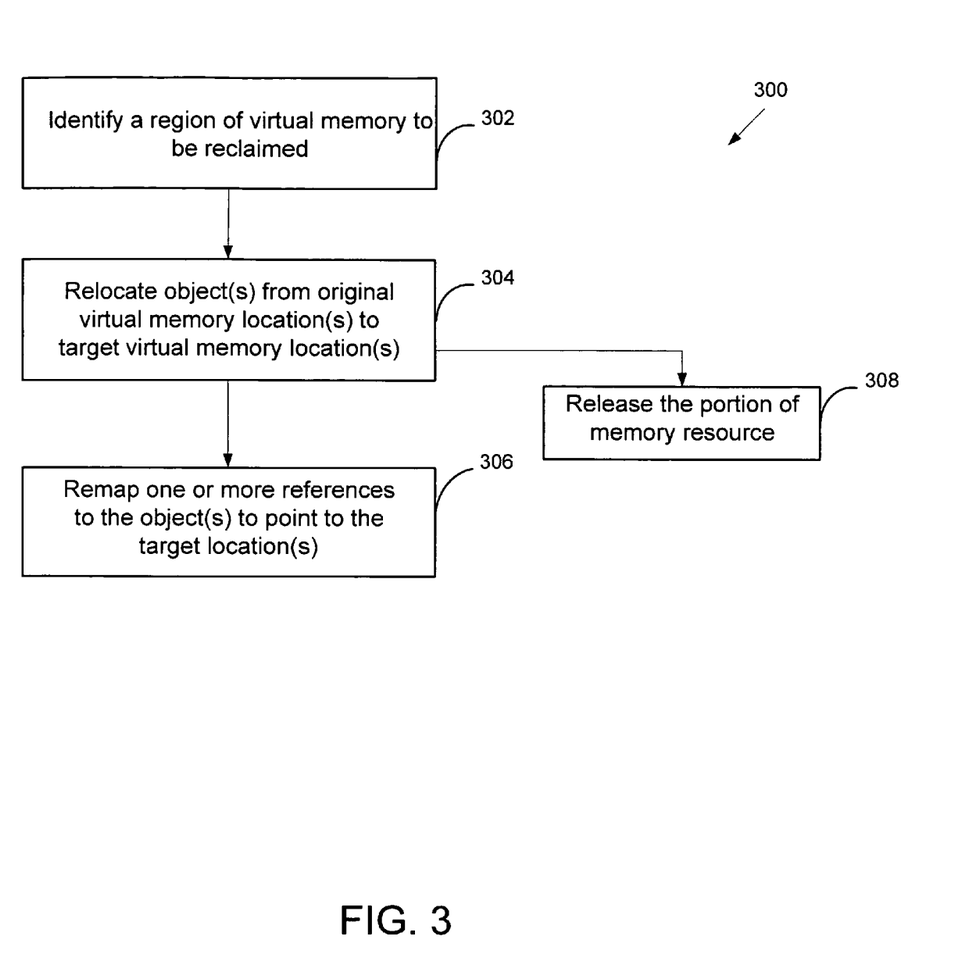
FIG. 3 is a flowchart illustrating an embodiment of a quick releasing garbage collection process.

FIG. 3 is a flowchart illustrating an embodiment of a garbage collection process. In some embodiments, process 300 is implemented on a system such as system 200. At 302, a source region of virtual memory to be reclaimed is identified. In some embodiments, identification of such a source region includes traversing the objects in memory, marking the ones that are alive, and finding regions that are suitable for reclamation. For example, virtual memory pages that are sparsely populated with live objects are considered good candidates for reclamation. In this example, the source region of interest is supported by at least a portion of a memory resource (sometimes referred to as the source portion of the memory resource). The source region includes at one or more live object(s). The live object(s) are currently located at their respective original virtual memory location(s) (also referred to as the source virtual memory locations) within the source region of virtual memory. The source region of virtual memory is supported by and mapped to a source portion of the physical memory.

At 304, the live object(s) are relocated from their respective original virtual memory location(s) to respective target memory location(s) within a target region of virtual memory. This is done in some embodiments by making a copy of each object at a target memory location. The target region of virtual memory is supported by a different memory resource than the memory resource supporting the source region. For example, the target region of virtual memory may be mapped to a target portion of physical memory. At 306, references to the source live object(s) are remapped to point to the target memory location(s).

Once the object(s) are relocated, at 308, the source portion of memory resource that supports the source region of virtual memory is released and may be reused. Releasing the memory resource portion can occur prior to or contemporaneously with remapping the references to the target location. In other words, the memory resource can be reused even before all the references to the object(s) are remapped. Optionally, the source virtual memory region is released once all the references to all the objects have been remapped.

Figure 4:
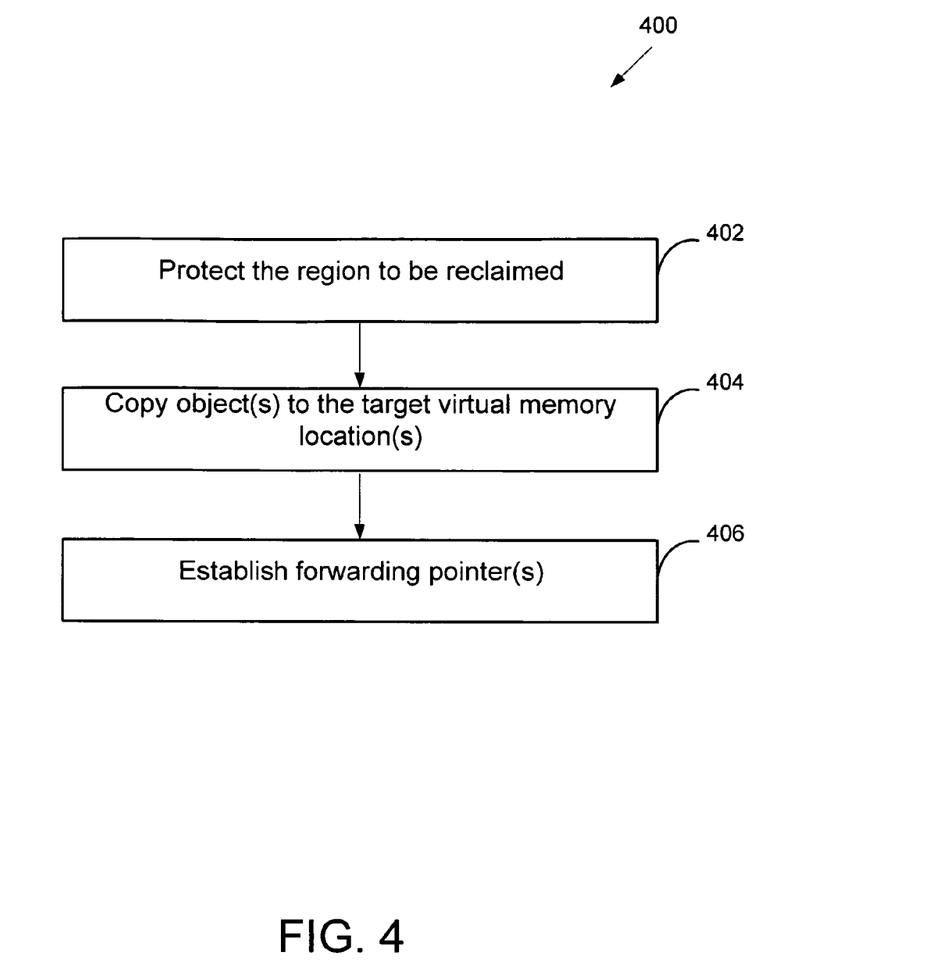
FIG. 4 is a flowchart illustrating an embodiment of a relocation process.

FIG. 4 is a flowchart illustrating an embodiment of a relocation process. Process 400 may be used to implement 304 of 300. Process 400 begins after a memory region has been identified as one that should be relocated. At 402, the region to be reclaimed is optionally protected so that mutators (i.e., user level programs) cannot access objects within the region. In some embodiments, the region to be protected includes one or more pages in memory. One or more corresponding entries in the page table and/or TLB are marked to indicate that the page is protected. In some embodiments, a garbage collection load barrier is inserted prior to each load instruction. The garbage collection load barrier performs a sequence of one or more operations that cooperates with the garbage collector without changing the program logic. The garbage collection barrier tests the reference to be loaded to determine whether it refers to a page that is protected. The test may be conducted by checking the corresponding page entry in the page table and/or TLB. If the page is marked as protected in the page table and/or TLB, the test result will show that the region is protected and the barrier will trigger, preventing the reference from being loaded.

At 404, a live object currently residing in the protected region is relocated to a new region. In some embodiments, the object is copied to a new page in virtual memory, and is copied to a new section in physical memory that supports the virtual memory page. 402 and 404 may be repeated for a plurality of objects and a plurality of memory regions. Relocating the objects also compacts memory since a number of objects from different pages may be relocated to a single page. At 406, a forwarding pointer pointing to the relocated object is established. In some embodiments, the forwarding pointer is kept outside of the memory region so that it is unaffected by changes to the memory region. The forwarding pointer may be included in an array, a table, or any other appropriate data structures stored in a cache, a special purpose register, or some other memory component accessible by the processor. The forwarding pointer is used to remap object references to the target location. The memory resource used to support the source object can be released as soon as the page is protected and the forwarding pointer is stored, even before remapping completes.

Figure 5A:
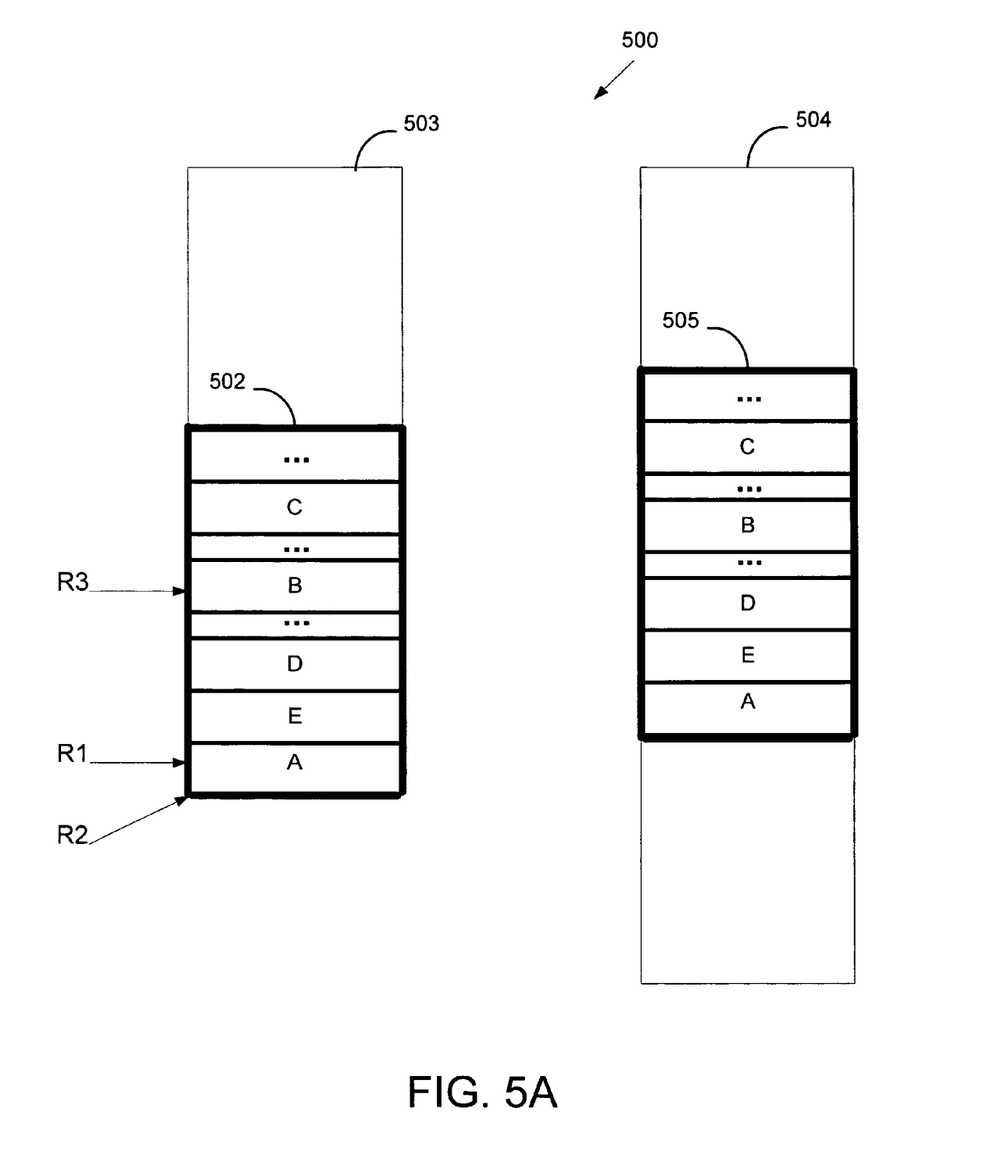
FIGS. 5A-5E are memory diagrams illustrating an embodiment of a quick release garbage collection process.
Figure 5B:
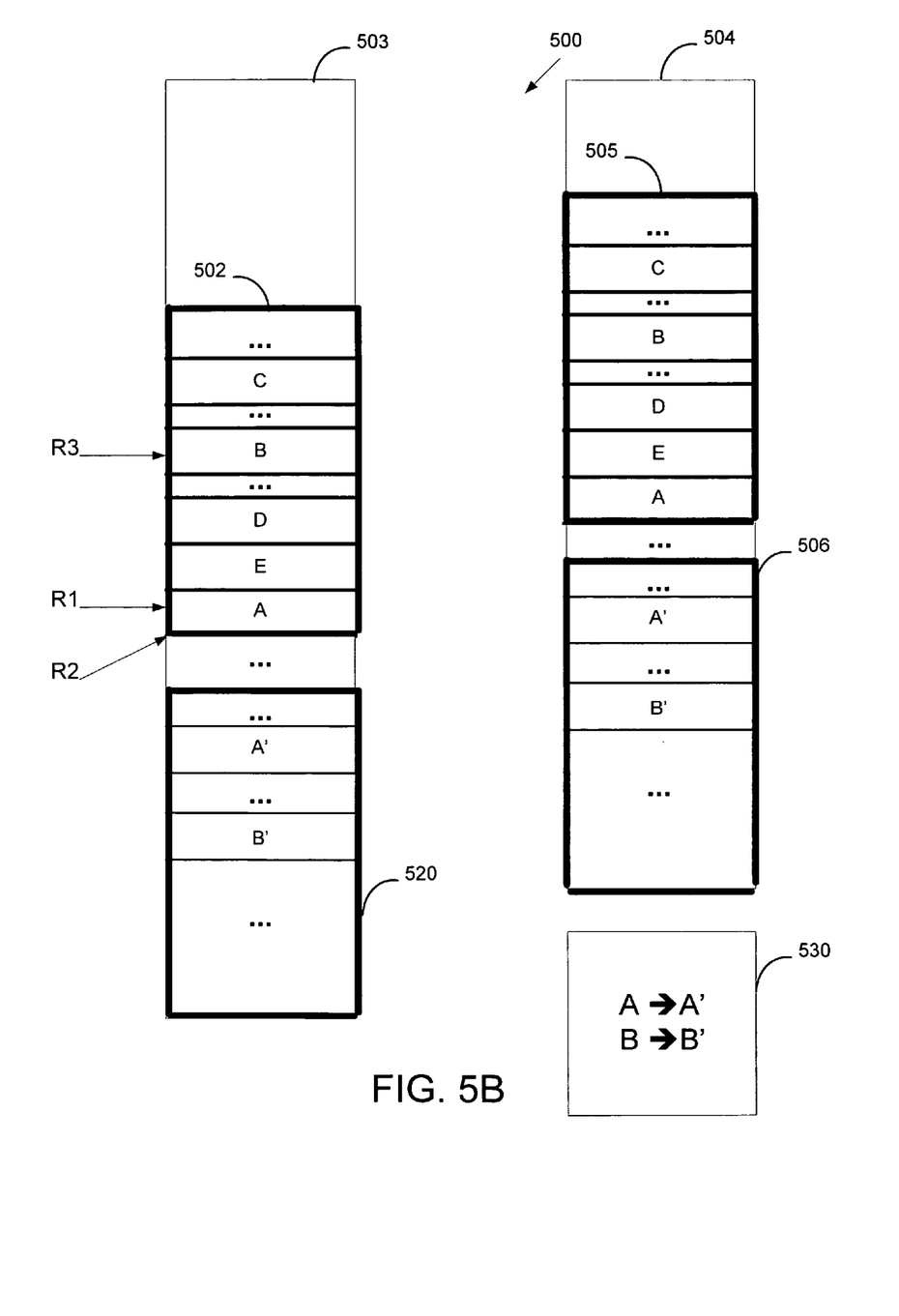
Figure 5C:
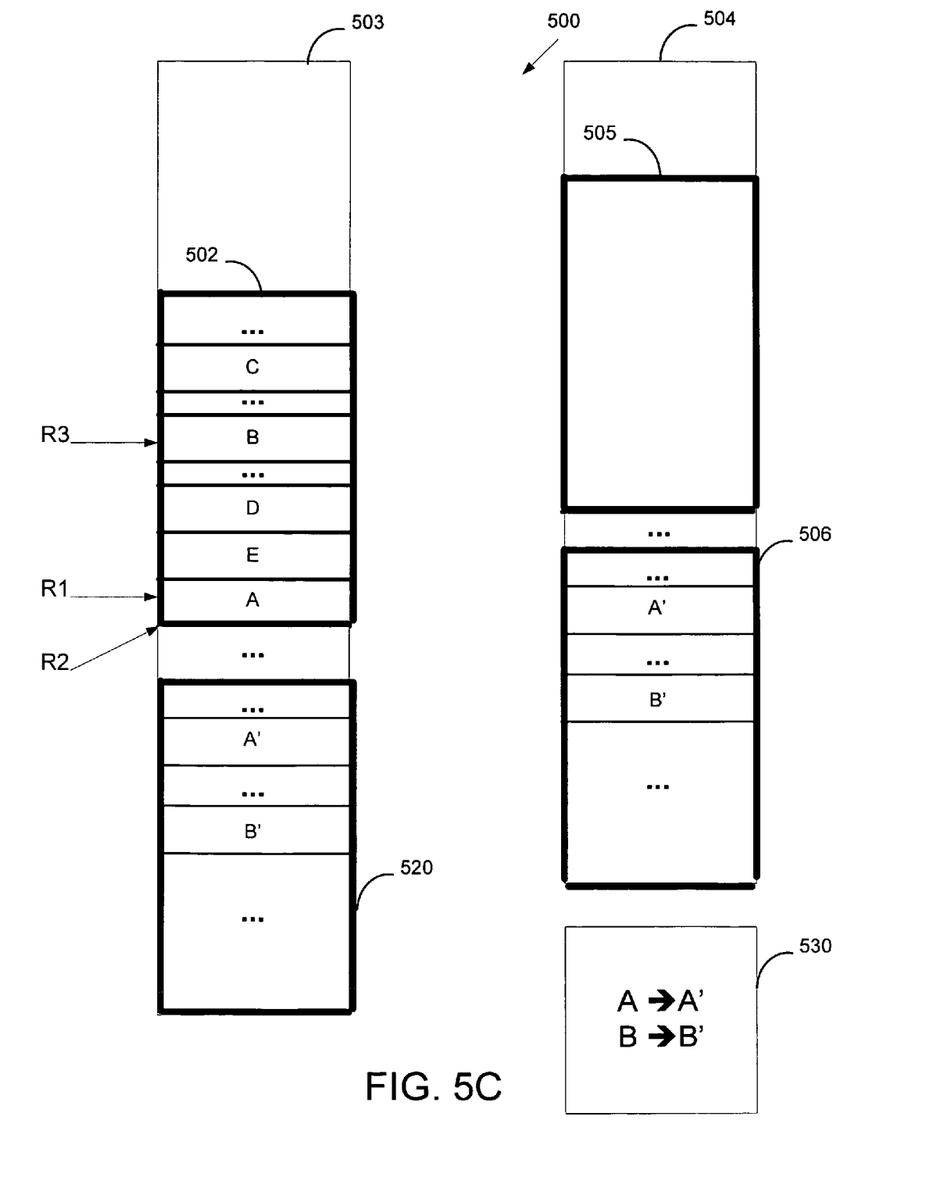
Figure 5D:
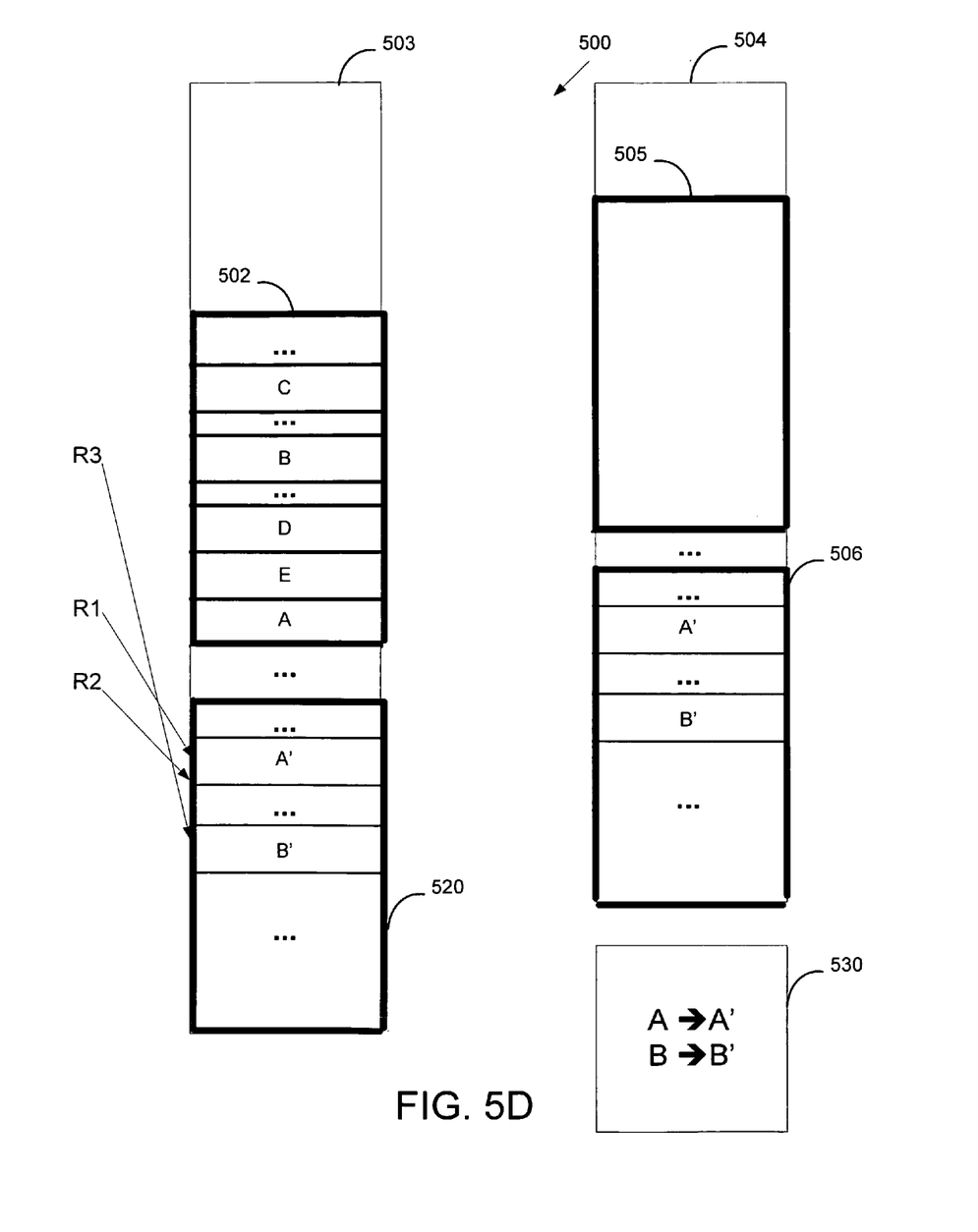
Figure 5E:
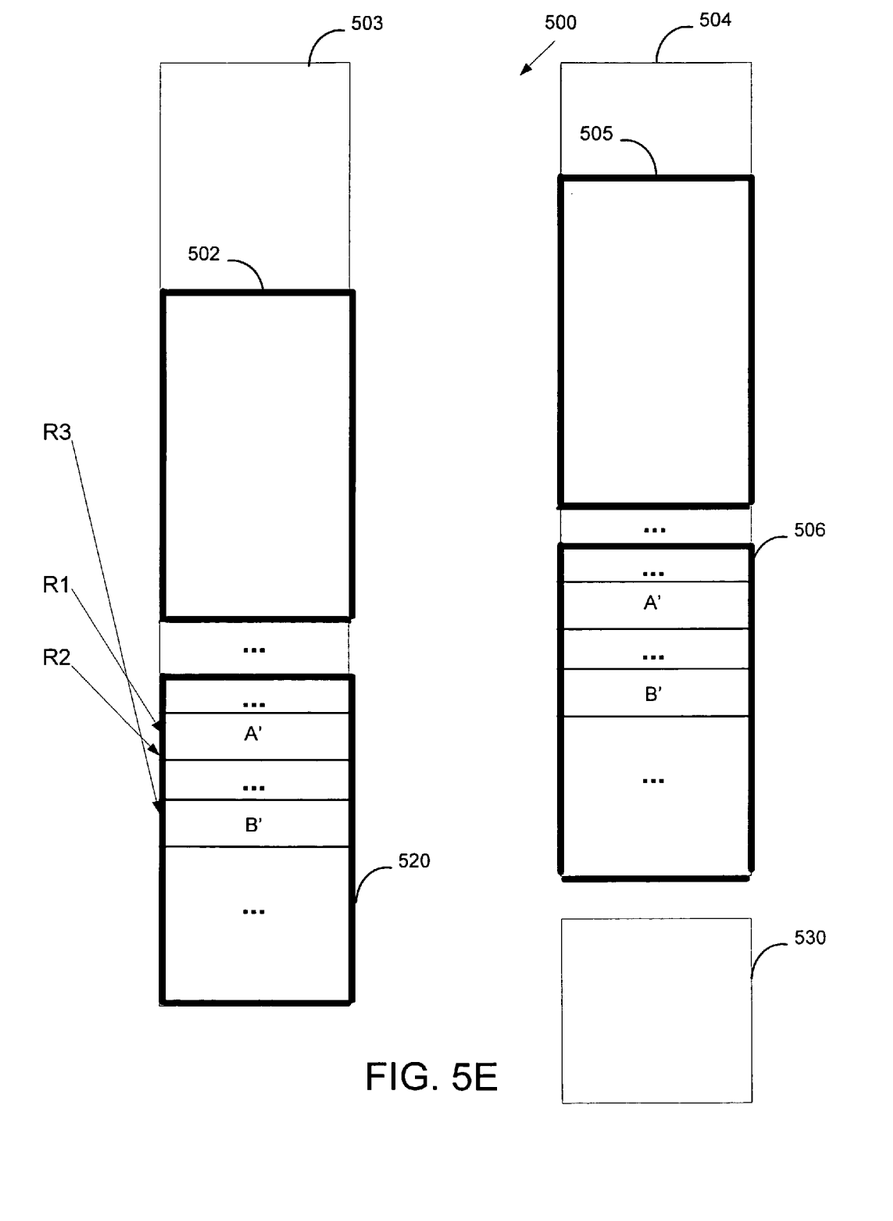

FIGS. 5A-5E are memory diagrams illustrating an embodiment of a system that carries out a garbage collection process with memory quick release. In this example, FIG. 5A shows an embodiment of a memory system 500 that includes a physical memory resource 504. In virtual memory space 503, block 502 is identified as the area to be reclaimed. In this example, block 502 corresponds to a page in virtual memory, although other memory units may be used as appropriate. Virtual memory block 502 is supported by physical memory block 505. Located within the virtual memory block are virtual objects A-E, which map to objects A-E the physical memory block 505. The contents of objects A-E are stored in corresponding objects in the physical memory block. Objects A and B are live. Object A is referenced by references R1 and R2, and B by R3. C, D, and E are dead objects without any outside reference The embodiment of the process is further illustrated in FIG. 5B, where live objects A and B are relocated from virtual memory page 502 to a target virtual memory page 520, which is supported by a corresponding target physical memory page 506. A' and B' are copies of A and B, respectively. The page table/TLB is updated to show that page 502 is protected (not shown). Forwarding pointers that maps A to A' and B to B' are added to a forwarding pointer table 530, which is kept separately in memory from the target page. If a reference to A or B is loaded from memory, a load barrier conducts a check against the page table/TLB. The test result will indicate that the page in which the objects reside is protected. The barrier will replace the reference with the forwarding pointer. Thus, as shown in FIG. 5C, as soon as page 502 becomes protected and the forwarding pointers are set up, memory resource 505 can be released without causing disruptions to the operations of program mutators. In FIG. 5D, references R1, R2 and R3 are remapped to the new objects A' and B' while the memory resources are released or after the resources have been released. In FIG. 5E, original virtual memory page 502 is also reclaimed, and the entries in the forwarding pointer table are optionally removed.

In some embodiments, the load barrier includes a self-healing trap handler. Before an object is accessed by a load operation, the load barrier performs its test to determine whether the virtual memory page in which the object resides is protected. If the page is protected, trap handler code is invoked to repair the condition by following the forwarding pointers and remapping the references to the objects in the page to their appropriate target locations. Once the trap handler remaps the references, another load operation of the same object will not cause the barrier to trigger, thereby improving efficiency and performance. In some embodiments, the remapping is conducted by the garbage collector rather than a trap handler.

Garbage collection with memory quick release has been disclosed. By allowing memory resource supporting virtual memory to be released prior to or contemporaneously with remapping object references to appropriate target locations, the system reduces its memory requirement and is more efficient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of memory management, comprising:
   identifying a region of virtual memory to be reclaimed, the region including an object that is currently located at an original virtual memory location, and the region being supported by at least a portion of a memory resource;
   relocating the object from the original virtual memory location to a target virtual memory location;
   copying the object to the target virtual memory location;
   establishing a forwarding pointer;
   protecting the region of virtual memory to be reclaimed;
   releasing the portion of the memory resource so that the portion of memory resource can be reused; and
   after the portion of the memory resource is released, remapping one or more references to the object to the target virtual memory location.

2. The method of claim 1, wherein the region includes a page of virtual memory.

3. The method of claim 1, wherein remapping includes remapping all references to the object are remapped to the target location.

4. The method of claim 1, wherein the memory resource is physical memory.

5. The method of claim 1, wherein the object is a live object.

6. The method of claim 1, wherein the target virtual memory location is supported by another portion of the memory resource.

7. The method of claim 1, wherein the forwarding pointer is stored outside the region of virtual memory to be reclaimed.

8. The method of claim 1, wherein protecting the region of virtual memory to be reclaimed includes marking the region.

9. The method of claim 1, wherein a garbage collection barrier triggers in the event the object is accessed after the region is protected.

10. The method of claim 1, further comprising redirecting an operation that references the object to the target virtual memory location.

11. The method of claim 10, wherein redirecting the operation includes providing the forward pointer to the target virtual memory location.

12. A system comprising:
   a memory resource;
   a processor coupled to the memory resource, configured to:
   identify a region of virtual memory to be reclaimed, the region including an object that is currently located at an original virtual memory location, and the region being supported by at least a portion of a memory resource;
   copy the object to the target virtual memory location;
   establish a forwarding pointer;
   protect the region of virtual memory to be reclaimed;
   relocate the object from the original virtual memory location to a target virtual memory location;
   release the portion of the memory resource so that the portion of memory resource can be reused; and
   after the portion of the memory resource is released, remap one or more references to the object to the target virtual memory location.

13. The system of claim 12, wherein the memory resource is physical memory.

14. The system of claim 12, wherein the object is a live object.

15. The system of claim 12, wherein the forwarding pointer is stored outside the region of virtual memory to be reclaimed.

16. The system of claim 12, wherein protecting the region of virtual memory to be reclaimed includes marking the region.

17. The system of claim 12, wherein a garbage collection barrier triggers in the event the object is accessed after the region is protected.

18. The system of claim 12, further comprising redirecting an operation that references the object to the target virtual memory location.

19. The system of claim 18, wherein redirecting the operation includes providing the forward pointer to the target virtual memory location.

20. A computer program product for memory management, the computer program product being embodied in a non-transitory computer readable storage medium and comprising computer instructions configured for:
   identifying a region of virtual memory to be reclaimed, the region including an object that is currently located at an original virtual memory location, and the region being supported by at least a portion of a memory resource;
   relocating the object from the original virtual memory location to a target virtual memory location; copying the object to the target virtual memory location;
   establishing a forwarding pointer;
   protecting the region of virtual memory to be reclaimed;

releasing the portion of the memory resource so that the portion of memory resource can be reused; and after the portion of the memory resource is released, remapping one or more references to the object to the target virtual memory location.

\* \* \* \* \*